United States Patent Office 3,721,378
Patented Mar. 20, 1973

3,721,378
APPARATUS FOR HANDLING FLEXIBLE
SUPPLY LINES
David Emrys Hughes, Bridgend, and Donald Davies, Maesteg, Wales, assignors to Coal Industry (Patents) Limited, London, England
Filed Jan. 31, 1972, Ser. No. 222,052
Claims priority, application Great Britain, Feb. 23, 1971, 5,226/71
Int. Cl. B65h 23/00
U.S. Cl. 226—119
11 Claims

ABSTRACT OF THE DISCLOSURE

Supply line handling apparatus for a mining machine consists of a trough securable to a guide for the machine. A bracket is attached to the machine and carries a feed arm through which the supply line passes to the machine, the arm extending into the trough to feed the line thereinto. The trough is provided with a number of displaceable resilient members, for example loops of resilient flexible material, which provide a gate across the trough. Upon movement of the machine the members are displaced by the arm which feeds the line into the trough below the members which, after the machine has passed, return to their entrapping position and retain the line within the trough.

This invention relates to apparatus for handling flexible supply lines.

In particular, but not exclusively, the invention relates to such apparatus for use in connection with mineral mining installations in which a mineral winning machine is adapted to traverse a mineral face to and fro longitudinally thereof and is mounted for guidance along the face by, for example, a conveyor or by a guide attachment on the conveyor. One type of winning machine known in the art as a coal plough is conveniently hauled along the face by a flexible haulage member e.g. a chain, which is suitably driven by drive means engageable therewith and located at an end or ends of the face. Other types of known winning machines include shearer drum cutter loaders, trepanners and trepan shearers and these machines are generally provided with a haulage drive located on the machine for driving a member engageable with a static or substantially static engagement means, for example, a chain, arranged longitudinally of and substantially parallel to the mineral face. When utilising these other types of machines a power supply has to be taken to the machine for the haulage drive and the cutting head thereof and this is generally in the form of a flexible power line, the flexible power line being connected at one end to a fixed source located at any convenient position e.g. in a roadway adjacent the face and at its other end to the machine.

Additionally, when any of the abovementioned winning machines traverses a face to win mineral e.g. coal therefrom a considerable amount of dust is created and, especially in the case of coal mines, dust laden air has an injurious effect on the health of personnel working in the vicinity of the machine. It is known to supply machines of the type referred to above with dust suppression fluid for example, water which is directed in the form of a spray onto the cutting element or onto the region adjacent the cutting element; for this purpose it is necessary to provide a continuous supply of the fluid to the machine, the supply being generally carried to the machine by a suitable flexible supply line.

In view of the foregoing it will be appreciated that the provision of flexible supply lines for machines of the types referred to above travelling along a mineral face necessarily involves the movement of the machine relative to the fixed supply source thus resulting in the formation of loops in the supply lines, the degree of looping depending on the nature and extent of machine travel. It is essential that the lines do not become fouled or damaged as the machine traverses the face; for example, the loop or loops may catch on projections on equipment associated with the conveyor or may tend to lie across the conveyor and become fouled by the mineral being conveyed by the conveyor.

In the case when winning machines traverse the face at relatively low speeds in the range 10 to 30 feet per minute an operator of the machine can easily progress along the face by the side of the machine as it travels therealong to control manually the supply lines and prevent fouling or damage as aforesaid. However, in the case of winning machines which travel at relatively higher speeds, say, 150 to 300 feet per minute a machine operator is unable to keep step with the machine to effect control of the lines as required. As a result the lines can become fouled resulting in serious damage and consequential loss of production during maintenance and repair.

It is therefore the object of the invention to provide apparatus for handling flexible lines attached to movable machines.

According to the invention apparatus for handling flexible supply lines includes an open channel member, a number of displaceable resilient members extending substantially across the open mouth of the channel member and secured to a side wall thereof, and a bracket adapted for attachment to a machine for supporting one or more supply lines, a portion of the bracket remote from the machine being adapted to extend into the mouth of the channel member, so as in use, to displace the said resilient members and to lay the said lines in the channel member.

The channel member may conveniently comprise a trough formed at an upper region of a side plate which may, for example, in the case of a mineral mining installation, constitute a spill plate for an armoured flexible conveyor. The trough may be integral with the plate in which case the upper region of the plate constitutes one side wall of the trough. Alternatively the trough may be separate from the side plate, in which case it is secured thereto by any convenient means for example, by welding. A relatively lower region of the side plate may be provided with abutments which are adapted for attachment, in the case of a mineral mining installation, to an advancing mechanism for the installation.

As an alternative the channel member may comprise a trough one side wall of which may, for example, in the case of a mineral mining installation, constitute a spill plate for an armoured flexible conveyor. In this alternative abutments would be provided on another side wall of the trough, the trough being suitably strengthened in the region of the abutments.

The trough in either alternative form of channel member may be provided with apertures formed in its base so as to permit in use the exit of material which may enter the trough.

The or each displaceable resilient member may conveniently be in the form of a loop of resilient flexible material, the loop being secured at each of its ends to a side wall of the trough remote from the side plate. The or each loop extends substantially laterally across the top of the trough so as to form a gate across the trough. As an alternative to the loops of resilient flexible material the or each displaceable resilient member may be in the form of a continuous sheet of resilient flexible material, the sheet extending substantially laterally across the top of the trough.

As a further alternative the or each displaceable resilient member may be approximately triangular in shape, an apex of the member being resiliently mounted on a side wall of the trough remote from the side plate. The base of the triangularly shaped member is preferably arcuate in form so as to permit free displacement of the member as the portion of the bracket remote from the machine passes it. The apex of the member may be resiliently pivotally mounted on said side wall of the trough for pivotal movement in a horizontal plane across the channel, the triangularly shaped member lying in a horizontal plane laterally across the open mouth of the channel. Alternatively the apex of the member may be resiliently mounted for movement laterally of the channel.

The open mouth of the trough is conveniently arranged upwardly and the supply lines are preferably fed into the trough below the resilient members.

The bracket may comprise an elongate portion for attachment to the machine, the portion having an aperture formed therein for the extension therethrough of one or more supply lines. The bracket may further comprise an arm substantially perpendicular to the elongate portion, the arm having a passage formed therein for the extension therethrough of one or more supply lines. The free end of the arm is adapted to extend a short distance into the troughs, so as in use, to lay a supply line, which extends from the machine over the elongate portion through the aperture therein and thence through the passage in the arm, into the trough. The arm conveniently has deflecting portions which are adapted in use to deflect the or each flexible member so as to allow the supply line to be laid in the trough.

The arm is preferably contoured on a base part thereof so as in use to depress a looped portion of a supply line or lines already lying within the trough, thereby permitting of the further laying of the supply line or lines in the trough.

The invention also includes an installation including a machine mounted for movement on a guide therefor, a channel member adapted for securement to the guide, a number of displaceable resilient members arranged across the open mouth of the channel member, and a bracket attached to the machine for supporting one or more supply lines, a portion of the bracket remote from the machine being adapted to extend into the mouth of the channel member, so as in use, to lay the said lines in the channel member.

The installation may for example be a mineral mining installation and the machine may be a coal plough or any of the types of machines hereinbefore referred to. The supply lines may be electrical power cables, water hoses, or hydraulic fluid lines or any combination thereof.

For a better understanding of the invention and to show how the same may be carried into effect, reference will now be made, by way of example only, to the accompanying drawings in which.

Figure 1:
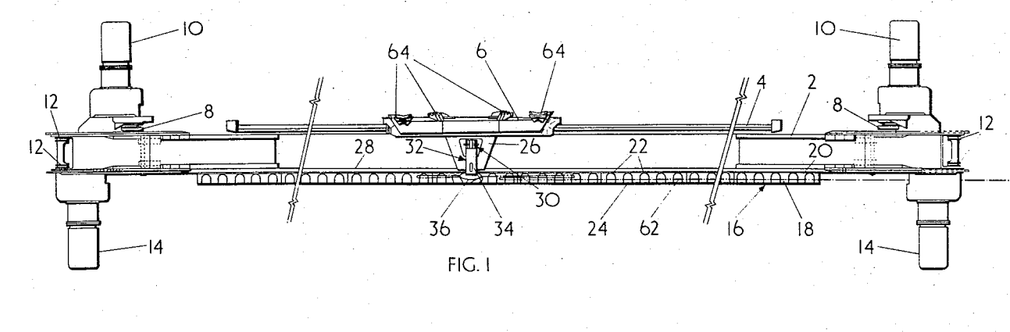
FIG. 1 is a plan view of a mineral mining installation including one embodiment of apparatus for handling supply lines according to the invention.

Referring to FIG. 1 a mineral mining installation includes an armoured flexible conveyor 2 having attached to one side thereof a guide 4 for a coal plough 6. The plough 6 is hauled to and fro along the guide 4 by a haulage chain (not shown) located within the guide, a lower part of the plough extending beneath the guide to engage the chain. The haulage chain is driven by sprockets 8 located at each end of the conveyor 2 and powered by motors 10. The conveyor 2 conveniently comprises a plurality of flight bars (not shown) interconnected by a chain or chains to form an endless loop or loops which are driven by drive sprockets 12 situated at each end of the conveyor and powered by motors 14.

Apparatus for handling supply lines includes an open topped channel member 16 in the form of a trough 18 a side plate 20 of which is secured to a wall of the conveyor 2 remote from the guide 4. In the installation shown in FIG. 1 a plurality of channel members 16 are arranged end to end longitudinally of the conveyor 2 so as to form a continuous or substantially continuous trough 18. A plurality of flexible members in the form of loops 22 extend substantially horizontally across the open mouth of the trough or troughs 18. Each loop 22 is formed of a length of flexible hose which is secured at each of its ends to a wall 24 of the trough 18. The loops 22 together form a gate across the open mouth of the trough or troughs 18 and extend across substantially the whole width of the trough or troughs 18.

The plough 6 is provided with a steady bar 26 which extends from the plough across the conveyor and curves downwardly to rest on an upper flange 28 of a side wall of the conveyor 2. An attachment plate 30 is secured superjacently the steady bar 26 to the plough 6. A bracket 32 is attached to the plate 30 and comprises an elongate portion 32 extending laterally across the conveyor 2 from the plough 6, and a downwardly extending arm 36 which extends into the trough or troughs 18.

Figure 2:
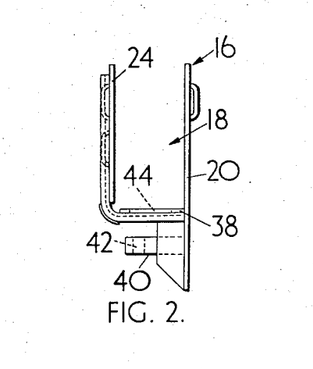
FIG. 2 is an end view of a first detail of the apparatus shown in FIG. 1.
Figure 3:
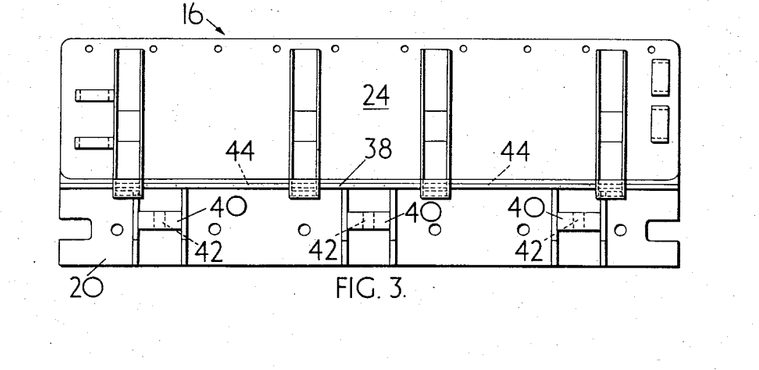
FIG. 3 is a side view of the first detail shown in FIG. 2.
Figure 4:
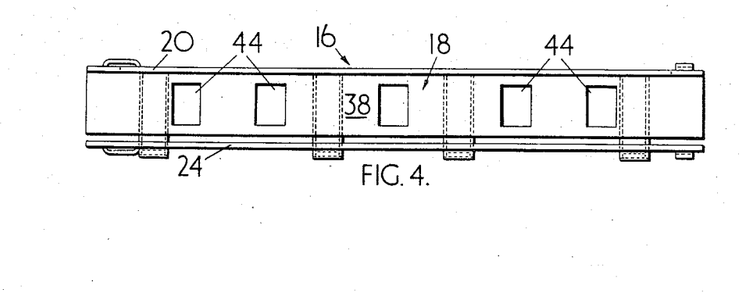
FIG. 4 is a plan view of the first detail shown in FIG. 3.

Referring particularly to FIGS. 2 to 4 the channel member 16 includes the trough 18 which is formed on one side by the wall 24 which is substantially L-shaped and on the other side by the side plate 20 which extends below base 38 of the trough 18, the side plate 20 constituting, in use, a spill plate for the conveyor 2. A number of abutments 40, in this case three in number, are secured to the side plate 20 below the base 38 of the trough 18 and are situated at spaced intervals longitudinally of the plate 20. Each abutment 40 is provided with a bore 42 which permits in use connection of the plate 20 to an advancing mechanism (not shown) for the conveyor 2. The base 38 of each trough 18 is provided with five rectangularly shaped apertures 44 (FIG. 4) which in use permit the exit of material which may enter the trough 18. A series of channel members is formed by connecting adjacent members end to end adjacent the conveyor 2, and adjacent channel members are aligned relatively to one another by resilient straps (not shown), which are fitted between the troughs 18.

Figure 5:
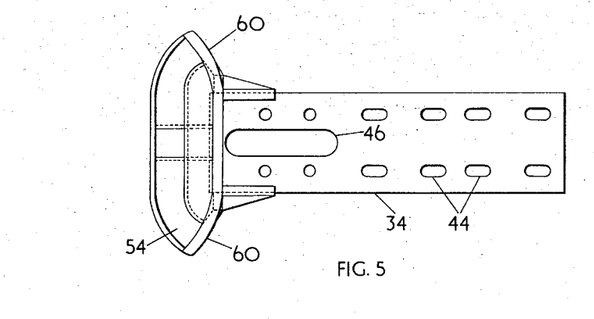
FIG. 5 is a plan view of a second detail of the apparatus shown in FIG. 1.
Figure 6:
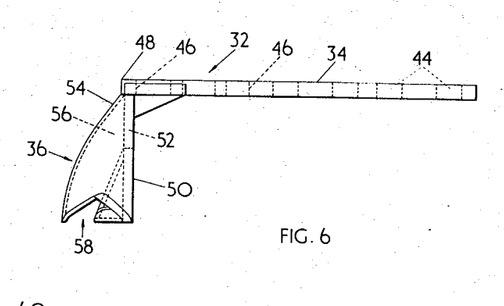
FIG. 6 is a side view of the second detail shown in FIG. 5.
Figure 7:
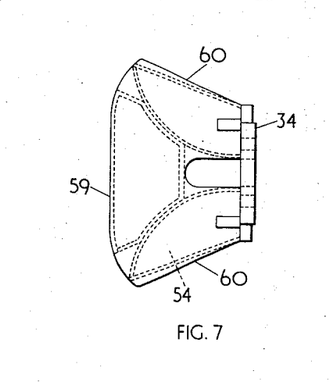
FIG. 7 is an end view of the second detail shown in FIGS. 5 and 6.

Referring now to FIGS. 5, 6 and 7 the bracket 32 comprises the elongate portion 34 and the downwardly extending arm 36. The elongate portion 34 is secured to the attachment plate 30 by means of bolts passing through holes 44 machined in the elongate portion; additionally the elongate portion is provided with a slot 46 as shown in FIG. 5. The arm 36 extends substantially perpendicularly from end 48 of the elongate portion adjacent the slot 46 formed therein. The arm 36 comprises a plate 50 having an aperture 52 formed therein adjacent the end 48 of the elongate portion 34. The arm 36 further comprises a radiused cover portion 54 which has a passage 56 formed therein which communicates at one end with the aperture 52 in plate 50 and leads at its other end to an opening 58 as shown in FIG. 6. The cover portion 54 has two deflectors 60 arranged symmetrically about the centre line of the arm 36 and which, in use, serve to deflect the flexible members 22 so as to permit the laying of a supply line or supply lines in the troughs 18; a base portion 59 of the cover portion 54 is arcuately formed such that, in use, loops already formed in a supply line or lines are easily depressed within the trough 18 to permit the further laying of the supply line.

The operation of the apparatus as above described is as follows:

A supply line 62, in this case a water hose, extends from a fixed source (not shown) to spray means (not shown) located on the plough adjacent cutting tools 64 (FIG. 1), the spray means being located on the plough so as to direct a spray of water onto the picks or onto a region adjacent to the picks. The supply line 62 is passed from the spray means over the elongate portion 34 and through the slot 46 formed therein, the supply line then being passed through aperture 52 in plate 50 to the passage 56 formed in the cover portion 54 and thence through the opening 58. The arm 36 extends downwardly into the trough 18 to a level below the flexible members 22 so as to lay the supply line 62 in the trough below the level as aforesaid.

Figure 8:
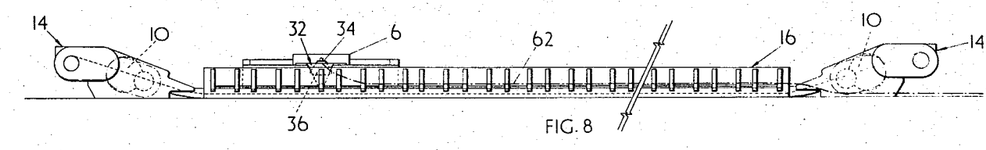
FIG. 8 is a side elevation of the mineral mining installation shown in FIG. 1 showing a mining machine in a first position.
Figure 9:
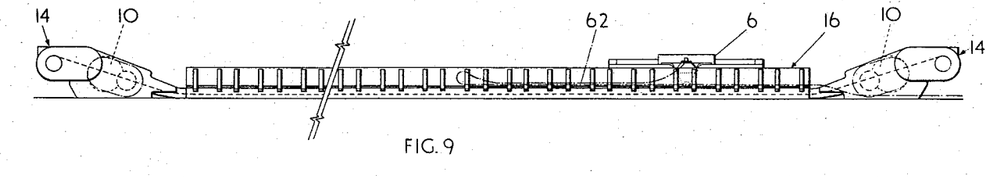
FIG. 9 is a side elevation of the mining installation shown in FIG. 1 with a mining machine shown in a second position.

The plate 50 is, in position within the trough 18, in close adjacency to side plate 20 such that the opening 58 is directed downwardly into the trough at a distance from the side plate 20 approximately half the lateral dimension of the trough. As can be seen in FIG. 8 the plough 6 is located at the extreme left-hand end, in the drawings, of the conveyor 2, the supply line 62 lying within the trough 18 substantially free of any loops. As the plough 6 moves towards the extreme right-hand end of the conveyor 2 the deflectors 60 deflect the resilient flexible loops 22 to lay the supply line 62 in the trough 18 thereby forming a loop in the supply line. Since the loops 22 are resilient, after the passage of the coal plough they return to a substantially horizontal position across the open mouth of the trough 18 so as to prevent the loop formed in the supply line from extending above the open mouth of the trough. FIG. 9 shows the plough in the extreme right-hand position on the conveyor and clearly shows the loop formed in the supply line 62 which is held within the channel 18 by the resilient loops 22. Since the plough 6 is arranged to be guided along the conveyor by the guide 4 for movement in both directions therealong it will be appreciated that as the plough moves from the extreme right-hand position as shown in FIG. 9 towards the extreme left-hand position further loops will be formed in the supply line 62 (FIG. 10), which loops will be accommodated within the trough 18 by virtue of the arm 36 laying the supply line below the level of the resilient loops 22. As the plough is hauled along the guide 4 the deflectors 60 of the arm 36 deflect the loops 22 so as to permit the laying of the supply line 62 within the trough 18.

Figure 10:
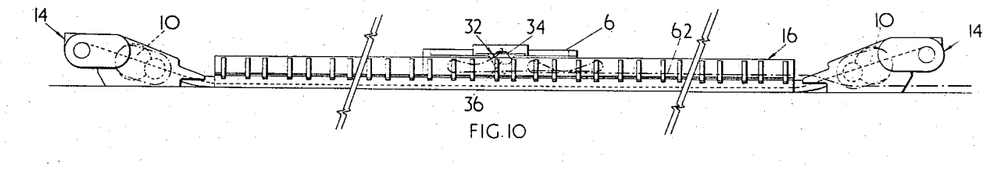
FIG. 10 is a side elevation of a mining installation showing a mining machine in a third position.

In FIG. 10, the loops already formed in the supply line 62 and lying in the trough 18 are depressed by the arcuate base portion 59 of the cover portion 54 of arm 36 as the arm passes over them so as to allow the laying of the supply line 62 as aforesaid. After the passage of the plough 6 past any particular point the resilient loops 22 resume their normal undeflected position, i.e. substantially, horizontally across the open mouth of the trough 18, and together constitute a gate for the trough 18, which gate retains the loop or loops of the supply line 62 within the trough 18.

It will be appreciated that in a modification of the invention the loops 22 of any single trough 18 may be replaced by a continuous or substantially continuous sheet of flexible resilient material.

Figure 11:
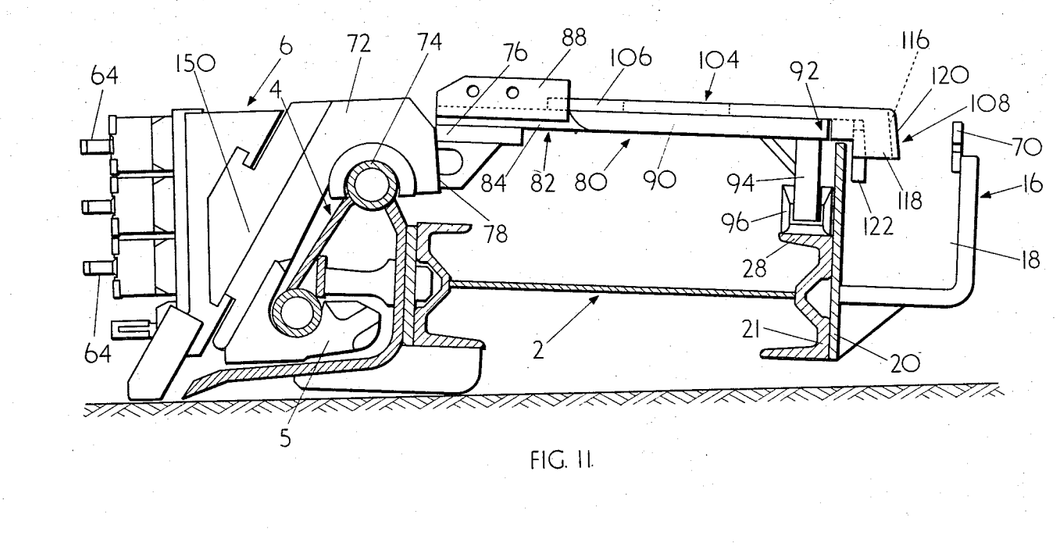
FIG. 11 is an end view, partly in cross-section of a further mineral mining installation including a further embodiment of apparatus for handling flexible supply lines according to the invention.
Figure 12:
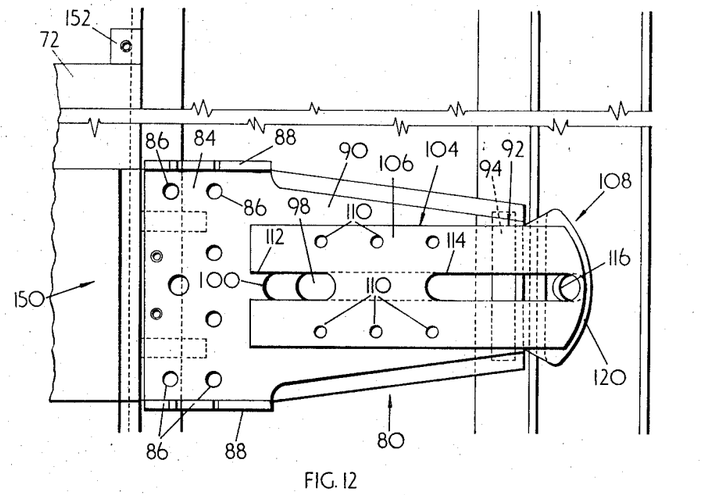
FIG. 12 is a plan view of the installation shown in FIG. 11.

Referring now to FIGS. 11 and 12 the same reference numerals are employed as in FIGS. 1 to 10 for like parts. A mineral mining installation includes an armoured flexible conveyor 2 having attached to one side thereof a guide 4 for a coal plough 6. The plough is hauled to and fro along the guide 4 by a haulage chain (not shown) located within the guide, a lower part 5 of the plough 6 extending beneath the guide to engage the chain. Suitable drive means (not shown) are provided for the haulage chain and the conveying members (not shown) of the conveyor 2.

Apparatus for handling supply lines includes an open topped channel member 16 in the form of a trough 18 a side plate 20 of which is secured to a side 21 of the conveyor 2 remote from the guide 4. A plurality of members 16 are arranged end to end longitudinally of the conveyor 2 so as to form a continuous or substantially continuous trough 18. A plurality of flexible members (not shown) similar to the loops 22 shown in FIG. 1 is provided on an upper part 70 of the trough 18. The flexible members together form a gate across the open mouth of the trough 18 and extend across substantially the whole width of the trough.

The plough 6 includes an upper engagement portion 72 which is adapted to engage a portion 64 of the guide 4. A mounting plate 76 is secured by, for example, welding to a rear face 78 of the portion 72 and is provide for the mounting of a stabilizer or steady arm 80. The steady arm 80 has an attachment portion generally designated by the reference numeral 82 which portion 82 comprises a base 84 provided with bores 86 for the extension therethrough of suitable fixing means (not shown), the means engaging similar bores (not shown) in the plate 76. The portion 82 further comprises wing pieces 88 upstanding from the edges of the base 84 and these pieces 88 are adapted in position to locate about and to be secured to a block (not shown) on the plough 6. Integral with and extending from the base 84 of the attachment portion 82 toward a side i.e. the goaf side of conveyor 2 remote from the guide 4 is a plate 90 which has depending from its free end 92 a downwardly extending support bar 94. The lower free end of the bar 94 has a shoe 96 connected thereto which shoe is adapted, as shown in FIG. 11, to bear on an upper flange 28 of the side 21 of the conveyor 2.

Figure 13:
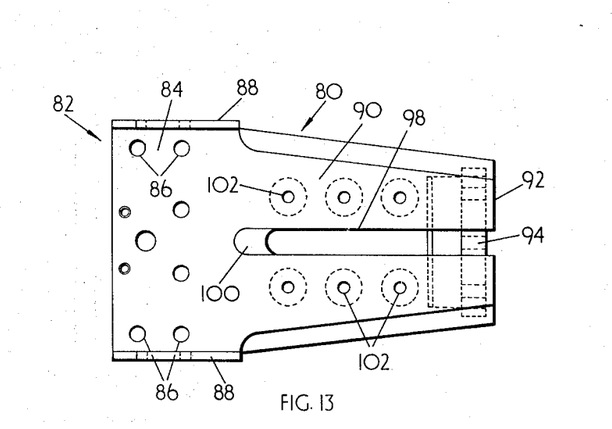
FIG. 13 is a plan view of a first detail shown in FIGS. 11 and 12.
Figure 14:
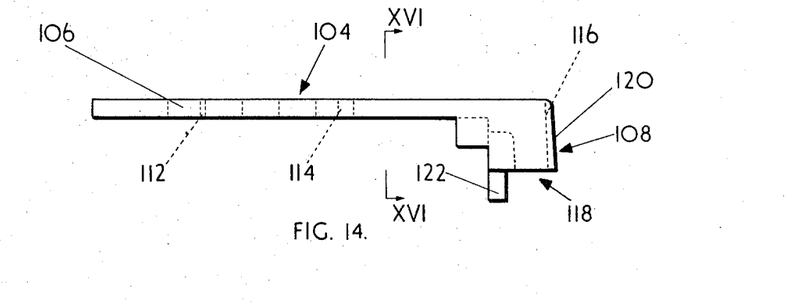
FIG. 14 is a side view of a second detail shown in FIGS. 11 and 12.
Figure 15:
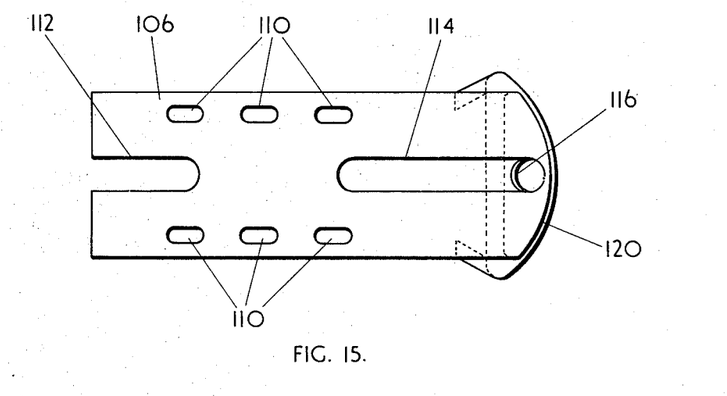
FIG. 15 is a plan view of the second detail shown in FIG. 14.
Figure 16:
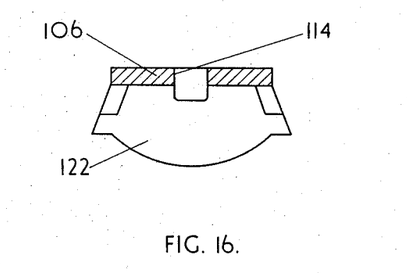
FIG. 16 is a section on the line XVI—XVI in FIG. 14.

The plate 90 has an elongate slot 98 (see particularly FIG. 13) located centrally and extending longitudinally thereof. The end 100 of the slot 98 is chamfered and the slot opens into the end 92 of the plate 90 as shown in FIG. 13. Mounting holes 102 are formed in the plate 90 either side of the slot 98 and are provided for receiving fixing means (not shown) for securing a bracket 104 to the plate 90. The bracket 104 (see particularly FIGS. 14, 15 and 16) comprises an elongate portion 106 attachable to the plate 90 of the steady arm 80, and a downwardly extending arm 108 which, as shown in FIG. 11, in position extends into the trough 18, the portion 106 having apertures 110 therein for the insertion of fixing means (not shown). The portion 106 is provided with an open-ended slot 112 and a further slot 114 which at one end thereof remote from slot 112 communicates with a passage 116 formed in the arm 108, the passage 116 communicating at the lower end with an opening 118 in the arm 108. The arm 108 has a radiused front cover portion 120 and is so radiused for the purpose, in use, of deflecting the flexible members (not shown). Additionally the arm 108 is provided with a lower base portion 122 which is also radiused (as shown in FIG. 16) and which serves, to depress loops already formed in the supply line within the trough 18 to permit the further laying of the supply line as the plough 6, in operation, traverses a mineral face.

Figure 17:
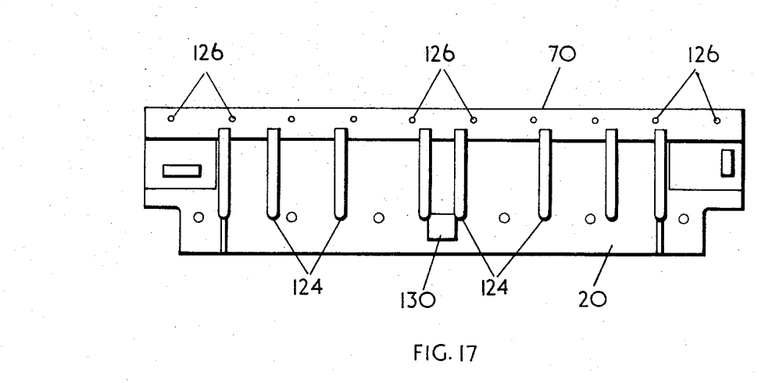
FIG. 17 is a side elevation of a third detail shown in FIGS. 11 and 12.
Figure 18:
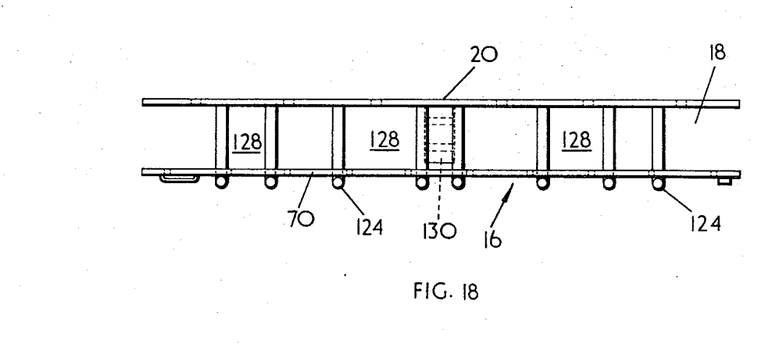
FIG. 18 is a plan view of the third detail shown in FIG. 17.

Referring now particularly to FIGS. 17 and 18 the channel member 16 in the form of the trough 18 includes the side plate 20 to which are secured for example by welding, a plurality of L-shaped rods 124, the rods 124 being secured in such manner to the plate 20 as to form the trough 18. The rods 124 are spaced apart lengthwise of the plate 20 as shown and are joined together at their upper free ends by the upper part 70 of trough 18, the upper part 70 having a number of holes 126 through the agency of which the flexible members (not shown) are secured thereto. Spaces 128 between the rods 124 at the base of the trough 18 are provided such that, in use, any material which may fall into the trough 18 may pass therefrom so as to leave the trough 18 free to accommodate the supply lines (not shown).

The side plate 20 is additionally provided with a bored lug 130 which enables a connection to be made between the plate 20, attached to the conveyor, and an advancing mechanism (not shown) for the installation.

With the mineral mining installation incorporating the apparatus arranged as shown in FIGS. 11 and 12 a supply line (not shown), for example a water hose, is provided and extends from a fixed source (not shown) to spray means (not shown) located on the plough 6 either adjacent tools 64 or in such position as to direct a spray of fluid i.e. dust suppression fluid onto a region adjacent the tools 64 during the cutting operation. The supply line is passed from the spray means onto the steady arm 80; the line passes through the slot 98 in the plate 90 over the chamfered end 100 thereof and through slot 112 of the elongate portion 106 of the bracket 104. Thence the line passes below the elongate portion 106 and along the slot 98 to emerge into the further slot 114 of the elongate portion 106. The line extends along slot 114 and thence passes into the passage 116 in the arm 108 whence the line emerges therefrom through the opening 118 and into the trough 18. The arm 108 extends downwardly into the trough 18 to a level below the flexible members (not shown) so as, in use, to enable the supply line to be laid in the trough below the flexible members.

In operation as the plough 6 traverses to and fro along a mineral face the arm 108 deflects the flexible members by means of the radiused front cover portion 120 thereof thus permitting access to the trough 18 by the supply line which is thereby laid in the trough, the members by virtue of their resilience, returning to a position across the open mouth of the trough 18 after the passage of the plough. By virtue of the reciprocal movement of to the plough 6 a number of loops may be generated in the supply line and with further movement of the plough the radiused base portion 122 of arm 108 assists in the further laying of the line into trough 18 by causing a depression of the loops already formed thereby to permit the further laying of the line into the trough.

In the case of the plough 6 comprising two parts, only one part 150 of which is shown, the two parts being connected by a flexible chain, a steady arm 80 is provided on each part; however it is usually only necessary to provide one bracket 104 attached to only one of the arms 80. In the case of a two part plough the supply line is connected to spray means on each part and a further line (not shown) is necessary to link the supply line to the plough part not provided with the bracket 104. A bored lug 152 attached to each part as shown in FIG. 12 and the lugs 152 are adapted to support a guard (not shown) for the further line mentioned above.

Notwithstanding the above it is within the scope of the invention to provide a bracket 104 for each part of a two part plough.

It is to be understood that the invention is not confined to mineral winning machines of the coal plough type but that it can also be applied to other types of mineral winning machines hereinbefore referred to.

We claim:

1. A machine supply lines handling apparatus including an open channel member, a side wall of the channel member, a number of displaceable resilient members extending across the channel member and secured to said side wall, a supply lines support bracket adapted for attachment to the machine, a channel engaging portion on the bracket, said portion extending into the channel member and being adapted, in use, to displace the said resilient members and to lay the supply lines in the channel member.

2. Apparatus according to claim 1 wherein each displaceable resilient member comprises a loop of resilient flexible material.

3. Apparatus according to claim 1 wherein the displaceable resilient member comprises a sheet of resilient flexible material.

4. Apparatus according to claim 1 including an elongate portion on the bracket, supply lines reception means in the elongate portion, an arm attached to the elongate portion, and supply lines guide means in the arm.

5. Apparatus according to claim 4 including a plate of the arm, the plate depending from the elongate portion of the bracket, and a cover portion for the plate, the supply lines guide means being formed in said cover portion.

6. Apparatus according to claim 5 including deflectors provided on the cover portion and arranged symmetrically thereabout.

7. Apparatus according to claim 5 including an arcuately formed base part on the bracket.

8. Apparatus according to claim 1 wherein the channel member comprises a side plate, an upper region on the side plate, and a trough formed at the upper region of said plate by the side wall which is substantially L-shaped.

9. Apparatus according to claim 1 including a side plate for the channel member, a plurality of substantially L-shaped rods attached to the side plate, and a trough formed by the rods and the side plate, the side wall of the member being attached to the rods.

10. An installation including a machine, a machine guide, a channel member adapted for securement to the guide, a side wall of the channel member, a number of displaceable resilient members extending across the channel member and secured to said side wall, a supply line support bracket, the bracket extending from said machine across said machine guide to said channel member, a portion on the bracket, said portion being remote from the machine and extending into the channel member and being adapted, in use, to displace the said resilient members and to lay the supply line(s) in the channel member on movement of the machine along the machine guide.

11. An installation as claimed in claim 10 wherein the installation is a mineral mining installation, and the machine is a mineral mining plough.

References Cited

UNITED STATES PATENTS

| | | | |
|---|---|---|---|
| 1,267,675 | 5/1918 | Levin | 299—48 |
| 1,729,781 | 10/1929 | Holmes | 299—48 |

RICHARD A. SCHACHER, Primary Examiner

U.S. Cl. X.R.

226—196; 299—29